Figure 2:
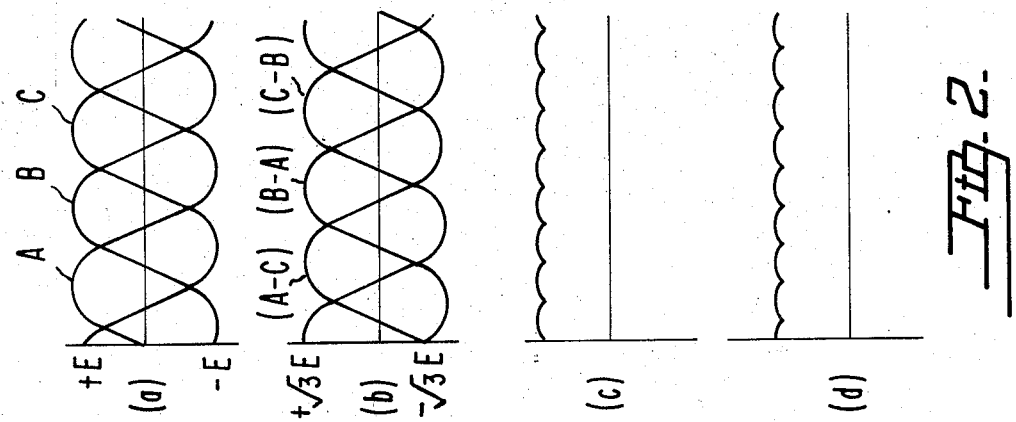

United States Patent [19]
Smith

[11] 3,772,601
[45] Nov. 13, 1973

[54] DUAL CHANNEL BALANCED LINE TYPE MODULATOR

[75] Inventor: William Irving Smith, Burlington, N.J.

[73] Assignee: RCA Corporation, New York, N.Y.

[22] Filed: Sept. 11, 1972

[21] Appl. No.: 287,723

[52] U.S. Cl. .................... 328/65, 328/60, 307/106, 321/5 A
[51] Int. Cl. ............................................. H03k 3/02
[58] Field of Search .................. 328/26, 60, 61, 65; 321/5 A; 307/106

[56] References Cited
UNITED STATES PATENTS

| | | | |
|---|---|---|---|
| 3,189,837 | 6/1965 | Grotz et al. | 328/65 X |
| 3,207,994 | 9/1965 | Theodore et al. | 328/65 X |
| 3,363,184 | 1/1968 | Smith | 328/65 |
| 3,566,245 | 2/1971 | Blokker et al. | 321/5 A |
| 3,569,727 | 3/1971 | Aggarwal et al. | 307/106 |
| 3,611,210 | 10/1971 | Theodore | 307/106 X |

Primary Examiner—John S. Heyman
Attorney—Edward J. Norton et al.

[57] ABSTRACT

A circuit for supplying pulse energy to a load such as a laser. The circuit is energized from a three phase supply. One channel operates on the crests of the phase voltages supplied while a second channel operates on the crests of the phase to phase voltages. The circuit provides, in effect, multiple phase rectification in a line type pulser operation without a rectifying transformer.

11 Claims, 5 Drawing Figures

DUAL CHANNEL BALANCED LINE TYPE MODULATOR

The present invention relates generally to the field of line type pulser circuits and more particularly to a line type pulser circuit having a multiple phase rectifier operation without the use of a transformer.

There are many applications where it is desirable to provide a D.C. voltage by rectifying the signals supplied from a three phase source. One practical application arises in the context of supplying pulse energy to power a laser. One method of supplying the D.C. voltage from a three phase source is to utilize a rectifier transformer with a delta primary winding and a delta-wye secondary winding configuration.

The problem with the transformer application is that in some cases the transformer itself may weigh as much as five hundred pounds. The weight factor becomes especially critical in the area of airborne applications.

The present invention, disclosed in the context of a dual channel line type pulser circuit provides, in effect, twelve phase rectification without the use of the conventional rectifier transformer.

Line type pulser circuits are generally used to provide pulse energy to particular types of loads. Prior art line type pulser circuits usually take the form of a D.C. supply, a single charging conductor, a single pulse forming network and a switch connected across the supply and the charging inductor. A typical prior art arrangement for a line type pulser circuit may be found in the U.S. Pat. No. 2,579,542.

The present invention not only provides transformer less 12 phase rectification but also provides a dual channel circuit for operating a load requiring pulsed energy.

In accordance with the present invention there is provided first, second and third terminals adapted for connection respectively to a source of first, second and third phase voltages provided by a three phase supply. Each of the first, second and third terminals has a connection to a first and second three phase bridge rectifier circuits. The first bridge provides fourth and fifth terminals while the second bridge provides sixth and seventh terminals. A first channel is connected between the fourth and fifth terminals and a second channel is connected between the sixth and seventh terminals. Each channel comprises: at least one energy storage means: the primary winding of a transformer: and a normally open switching means connected across the energy storage means and the primary winding. The first channel further comprises first and second voltage charging means serially connected across the fourth and fifth terminals with an intermediate point between the first and second charging means connected to a point of reference potential. The second channel further comprises a third voltage charging means connected across the sixth and seventh terminals. Finally, means are provided for connecting a load in circuit with the secondary windings of the transformers associated with the first and second channels.

IN THE DRAWING

Figure 1:
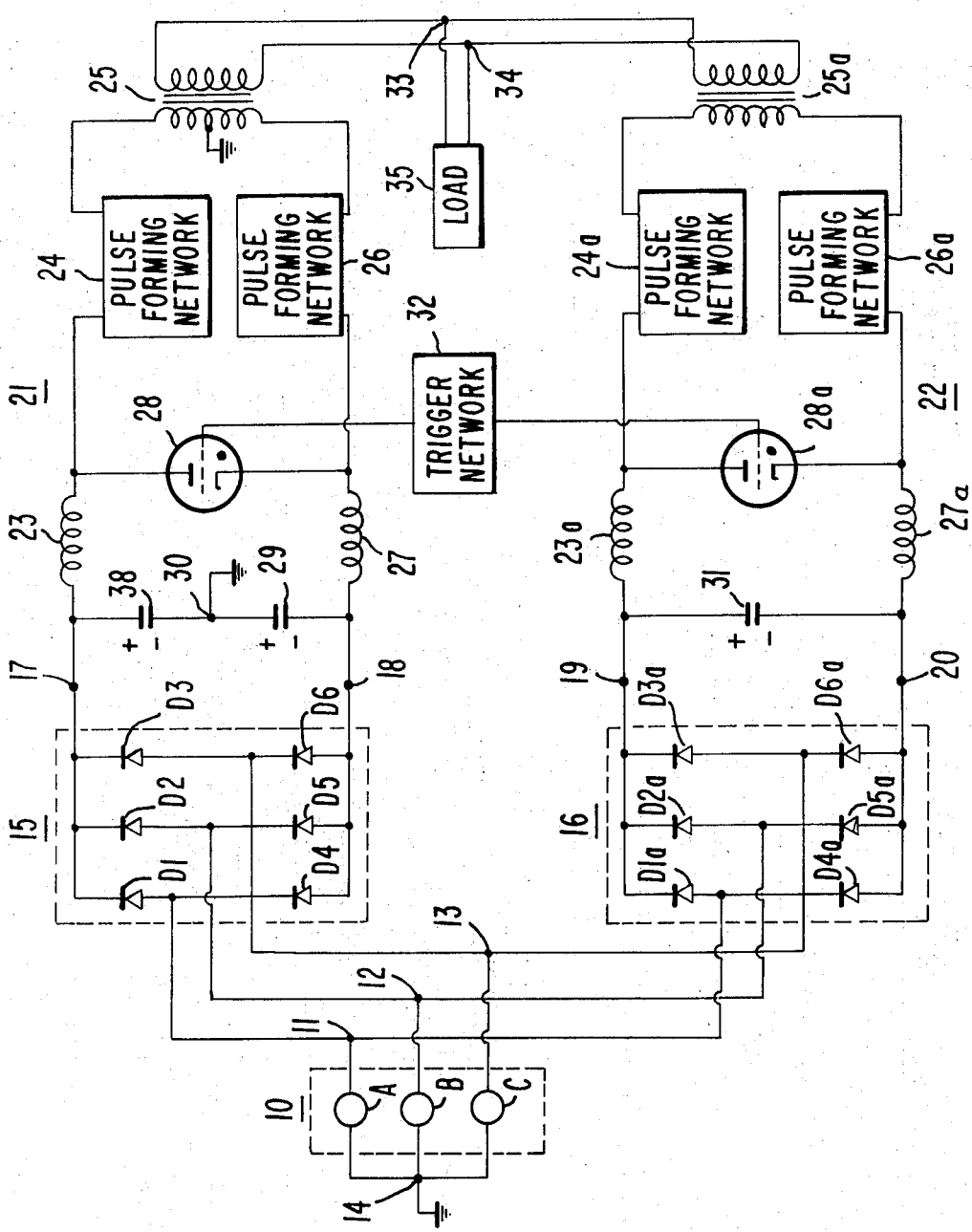

FIG. 1 is a partial schematic and partial block diagram of a preferred embodiment of the present invention; and FIGS. 2a–d are waveforms useful in the explanation of the embodiment of FIG. 1.

Referring now to FIG. 1, there is provided a three phase supply 10 which provides three phase voltages A, B, C to three terminals 11, 12 and 13 respectively. A common terminal 14 of supply 10 is returned to a reference potential, namely ground.

There is also provided first and second three phase full wave bridge rectifier circuits 15 and 16. Bridge 15 comprises diode D1–D6 and bridge 16 comprises diodes D1a–D6a arranged in conventional full wave bridge form.

In bridge 15, the cathode electrodes of diodes D1, D2 and D3 are connected to terminal 17, while the anode electrodes of diodes D4, D5 and D6 are connected to terminal 18. In bridge 16, the cathode electrodes of diodes D1a, D2a and D3a are connected to terminal 19, while the anode electrodes of diodes D4a, D5a and D6a are connected to terminal 20.

Terminal 11, which has phase voltage A applied thereto, is connected to a point between diodes D1 and D4 and also to a point between diodes D1a and D4a. Terminal 12, which has phase voltage B applied thereto, is connected to a point between diodes D2 and D5 and also to a point between diodes D2a and D5a. Terminal 13, which has phase voltage C applied thereto, is connected to a point between diodes D3 and D6 and also to a point between diodes D3a and D6a.

A first channel 21 is connected between terminals 17 and 18 and a second channel 22 is connected between terminals 19 and 20.

Channel 21 comprises an energy storage inductor 23 connected on one end to terminal 17. The other end of inductor 23 is connected to one end of pulse forming network 24. The other end of pulse forming network 24 is connected to one end of the primary winding of transformer 25. The other end of the primary winding of transformer 25 is connected to one end of a second pulse forming network 26. The other end of pulse forming network 26 is connected to one end of a second energy storage inductor 27. The other end of inductor 27 is connected to terminal 18. Pulse forming networks 24 and 26 serve as energy storage devices in the circuit and take the form of lumped-constant transmission lines as is known in the art. Since networks 24 and 26 serve not only as the source of electrical energy during the pulse generation time but also serve as pulse shapers networks such as 24 and 26 are commonly known as pulse forming networks of PFN's.

In addition, there is provided a normally open switching means, shown as thyratron tube 28, having the anode electrode connected to a point between inductor 23 and pulse forming network 24 and the cathode electrode connected to a point between inductor 27 and pulse forming network 26. Thyratron tubes are customarily used in the present application, however, it is evident that other switching devices such as silicon controlled rectifiers may be used in place of the tubes if desired.

Channel 22 has corresponding elements connected in similar fashion as those thus far described for channel 21. The elements comprise inductor 23a, pulse forming network 24a, the primary winding of a transformer 25a, a second pulse forming network 26a, a second inductor 27a and a thyratron switching means 28a. The elements just mentioned are connected between terminals 19 and 20.

Channel 21 also comprises first and second voltage charging capacitors 38 and 29 respectively connected in series circuit across terminals 17 and 18. An intermediate point 30 between capacitors 28 and 29 is connected to a point of reference potential, namely ground.

Channel 22 further comprises a third voltage charging capacitor 31 connected across terminals 19 and 20.

A trigger network 32 supplies triggering signals simultaneously to the grid electrodes of the thyratron switches 28 and 28a. Although one trigger network 32 is shown in FIG. 1 to serve channels 21 and 22, it is possible to use separate trigger networks to practice the present invention.

The primary winding of transformer 25 in channel 21 has an intermediate tap point thereon returned to a point of ground potential whereas the primary winding of transformer 25a in channel 22 is not referenced to ground. The secondary windings of transformers 25 and 25a are connected to add the signals appearing across the secondary windings at a pair of output terminals 33 and 34. A load 35 to be energized is then connected across terminals 33 and 34.

The circuit thus far described operates in the following manner. The three phase source supplies three voltage signals A, B and C having equal magnitudes and differing in phase by 120° as shown in FIG. 2(a). Full wave rectifier 15 rectifies the phase voltages A, B and C and capacitor 38 is charged to a positive voltage level at the end thereof connected to terminal 17. Capacitor 29 is charged to a negative voltage level at the end thereof connected to terminal 18. It should be noted at this point that when phase voltage A is positive, about a certain level, diode D1 conducts and a circuit path is completed from terminal 11, through diode D1, capacitor 38, terminal 30, and back to terminal 14. The same type of path tracing may be made through the corresponding diodes in full wave rectifier 15 and capacitors 38 and 29. Thus, the capacitors 38 and 29 are being charged to a level corresponding to the crests of the phase voltages A, B and C with respect to ground potential. FIG. 2(c) shows the full wave rectified signals, with the negative rectified phases interleaved with the positive rectified phases, resulting from the rectification of the voltages A, B and C with respect to ground.

Looking now at the full wave rectifier 16, it will be noted that the capacitor 31, associated therewith, is not referenced to ground. In this case when diode D1a is conducting in the positive half cycle of phase voltage A, for at least a portion of the time, diode D6a is conducting on the negative half cycle of phase voltage C. The result is that capacitor 31 appears to be placed across terminals 11 and 13 for a period of time. The end of capacitor 31 connected to terminal 19 charges to a positive voltage level and the other end, connected to terminal 20, charges to a negative level.

In effect then, capacitor 31 is being charged by the phase to phase voltage signals whereas capacitors 38 and 29 are being charged by the phase to ground voltage signals. Thus, capacitor 31 sees the composite signals of phase A minus phase C, phase B minus phase A and phase C minus phase B. The composite waveforms are shown in FIG. 2(b). The resulting waveforms shown in FIG. 2(b) have an amplitude which is greater by a factor of $\sqrt{3}$ and are shifted by 30° as compared to the waveforms of FIG. 2(a).

The full wave rectified signal supplied to channel 22 is shown in FIG. 2(d) with the negative levels inverted. Comparing FIGS. 2(c) and 2(d) shows how the ripple voltage of channel 21 is shifted by 30° with respect to the ripple voltage of channel 22. When these voltages are combined, as will be described herein, the results are: reduced ripple modulation of the modulator output, increase ripple frequency and a significant lowering of the harmonic content in the current waveform drawn from the power source 10 due to the offset just described. This is similar to the result one may obtain through the use of a rectifier transformer having a delta primary winding and delta and wye secondary windings. The advantage here being the elimination of the transformer while maintaining the same high ripple frequency, reduced ripple amplitude, and lowered harmonic content in the currents drawn from the power source 10.

Continuing with the operation of the circuit, pulse forming network 24 is charged to a positive level via inductor 23 and pulse forming network 26 is charged to a negative level via inductor 27.

Likewise, pulse forming network 24a is charged to a positive level via inductor 23a and pulse forming network 26a is charged to a negative level via inductor 27a.

When a trigger signal is simultaneously applied from trigger network 32 to the normally opened switching devices 28 and 28a, a discharge circuit is completed for channel 21 and a discharge circuit is completed for channel 22.

As previously noted, the voltage levels in channel 22 will be greater than the levels in channel 21 by a factor of $\sqrt{3}$. Thus, in order to equalize the pulse voltage levels in the secondary windings of transformers 25 and 25a, the turns ratios of transformers 25 and 25a should be adjusted accordingly.

An alternative arrangement for equalizing the outputs of channels 21 and 22 is to use filter chokes between the bridge rectifiers 15 and 16 and their corresponding voltage charging capacitors. The filter chokes would then be adjusted to equalize out the voltage levels and a single output pulse tranformer could be used with the output terminals of networks 24–26 and 24(a)–26(a) connected in parallel at the primary winding of the single transformer.

As shown in FIG. 1, the secondary windings of transformers 25 and 25a are connected to each other to add the voltages appearing in the secondary windings and supply the resulting signal to load 35 connected to terminals 33 and 34.

The pulses supplied to the load 35 will have a repetition rate determined by switching rate of the switching devices 28 and 28a. The pulse shape of the output pulses will depend, for the most part, on the design of pulse forming networks 24, 26, 24a and 26a.

Thus, as described, the present invention provides a dual channel line type pulser circuit with a low harmonic content output signal without utilizing the conventional rectifier transformer.

What is claimed is:
1. The circuit comprising:
   1. first, second and third terminals adapted for connection respectively to first, second and third phase voltages provided by a three phase supply,
   2. first and second full wave three phase bridge rectifier circuits, each being coupled to said first, second and third terminals, said first bridge providing fourth and fifth terminals, said second bridge providing sixth and seventh terminals;

3. a first channel connected between said fourth and fifth terminals and a second channel connected between said sixth and seventh terminals, each channel comprising:
   a. at least one energy storage means;
   b. the primary winding of a transformer having a primary and a secondary winding: and
   c. a normally open switching means connected across the energy storage means and the primary winding;
4. said first channel further comprising a first and second voltage charging means serially connected across said fourth and fifth terminals with an intermediate point between said first and second charging means connected to a point of reference potential;
5. said second channel further comprising a third voltage charging means connected across said sixth and seventh terminals; and
6. means adapted for connecting a load in circuit with the secondary windings of the transformers associated with said first and second channels.

2. The circuit according to claim 1 wherein said power supply includes a terminal connected to said reference potential.

3. The circuit according to claim 1 wherein said first, second and third voltage charging means comprise capacitive energy storage devices.

4. The circuit according to claim 1 wherein the turns ratio of the transformers in said first and second channels are arranged to provide substantially equal magnitude signal levels across the secondary windings thereof.

5. The circuit according to claim 1 wherein said at least one energy storage means comprises a pulse forming network.

6. The circuit according to claim 1 further comprising means for simultaneous operating the switching means in said first and second channels.

7. A dual channel balanced line type pulser circuit comprising:
   1. first, second and third terminals adapted for connection respectively to three phase voltages provided by a three phase supply, said supply also having a terminal connected to a point of reference potential;
   2. first and second full wave three phase bridge rectifier circuits each being coupled to said first, second and third terminals, said first bridge providing a positive potential at a fourth terminal and a negative potential at a fifth terminal, said second bridge providing another positive potential at a sixth terminal and a negative potential at a seventh terminal;
   3. a first channel connected between said fourth and fifth terminals, and a second channel connected between said sixth and seventh terminals, each channel defining a series path comprising:
      a. a first current charging device;
      b. a first pulse forming network;
      c. the primary winding of a transformer having a primary and a secondary winding;
      d. a second pulse forming network; and
      e. a second current charging device;
   4. each channel further comprising a normally open switching means for selectively providing a low inpedance path across the first and second pulse forming networks and the primary winding of the transformer;
   5. said first channel further comprising:
      a. a first and second voltage charging means serially connected across said fourth and fifth terminals with an intermediate point therebetween connected to said point of reference potential; and
      b. means connected an intermediate point on the primary winding of the transformer to said point of reference potential;
   6. said second channel further comprising a third voltage charging means connected between said sixth and seventh terminals; and
   7. means adapted for connecting a load in circuit with the secondary windings of the transformers associated with said first and second channels.

8. The circuit according to claim 7 further comprising means for simultaneously operating the switching means in said first and second channels.

9. The circuit according to claim 7 whrein the turns ratio of the transformers in said first and second channels are arranged to provide substantially equal magnitude signal levels across the secondary windings thereof.

10. The circuit according to claim 7 wherein said first, second and third voltage charging means comprises capacitive energy storage devices.

11. The circuit according to claim 10 wherein said first and second current charging devices comprise first and second inductors.

* * * * *